United States Patent
Allard-Latour et al.

(10) Patent No.: US 12,102,046 B2
(45) Date of Patent: Oct. 1, 2024

(54) SEAWEED CULTIVATION METHOD AND SYSTEM

(71) Applicant: Cargill, Incorportated, Wayzata, MN (US)

(72) Inventors: Aurelie Marie Allard-Latour, La roche Maurice (FR); Julian Hermoyner Caceres Villegas, Santiago (CL); Jan Sebastien, Plouguerneau (FR); Emilio Antonio Mercado Tapia, Puerto Montt (CL)

(73) Assignee: Cargill, Incorporated, Wayzata, MN (US)

( * ) Notice: Subject to any disclaimer, the term of this patent is extended or adjusted under 35 U.S.C. 154(b) by 64 days.

(21) Appl. No.: 17/907,690

(22) PCT Filed: Mar. 25, 2021

(86) PCT No.: PCT/US2021/024129
§ 371 (c)(1),
(2) Date: Sep. 29, 2022

(87) PCT Pub. No.: WO2021/202233
PCT Pub. Date: Oct. 7, 2021

(65) Prior Publication Data
US 2023/0134126 A1    May 4, 2023

(30) Foreign Application Priority Data
Apr. 1, 2020   (EP) .................................... 20167539

(51) Int. Cl.
*A01G 33/00* (2006.01)
*A01C 1/02* (2006.01)

(52) U.S. Cl.
CPC ................ *A01G 33/00* (2013.01); *A01C 1/02* (2013.01)

(58) Field of Classification Search
CPC .................................. A01G 33/00; C12N 1/12
See application file for complete search history.

(56) References Cited

U.S. PATENT DOCUMENTS

| | | | |
|---|---|---|---|
| 2005/0120624 A1 | 6/2005 | Levy | |
| 2008/0317926 A1 | 12/2008 | Trudsoe | |
| 2014/0127776 A1* | 5/2014 | Picard | .................... C12M 23/48 |
| | | | 435/178 |

FOREIGN PATENT DOCUMENTS

| CN | 105684879 A | 6/2016 | |
|---|---|---|---|
| EP | 2730647 A1 * | 5/2014 | ............. A01G 33/00 |
| EP | 1652435 B1 | 6/2017 | |
| FR | 2994428 A1 * | 2/2014 | ............. A01G 33/00 |
| JP | 2002176866 A | 6/2002 | |
| JP | 2012080797 A | 4/2012 | |
| KR | 102049751 B1 | 11/2019 | |

OTHER PUBLICATIONS

Hughes Melanie H et al: "Spore release and germling development on different substrates in the carrageenophyteSarcothalia crispatafrom the southwestern Atlantic coast". Journal of Applied Phycology. Kluwer. Dordrecht. NL. vol. 31. No. 2. Oct. 1, 2018 (Oct. 1, 2018). pp. 1285-1295. XP036753551. ISSN: 0921-8971. DOI: 10.1007/S10811-018-1643-7 [retrieved on Oct. 1, 2018] * the whole document *.

* cited by examiner

*Primary Examiner* — Kristen C Hayes (57) ABSTRACT

The present invention relates to a system and method for cultivating an seaweed, preferably *Sarcothalia crispata*, including releasing spores from seaweed reproductive tissue, inoculating a substrate with spores, germinating the spores and growing seaweed from the germinated spores. The invention also relates to a harvested batch of seaweed having a lambda carrageenan content of at least about 80 wt. % based on mass of all carrageenans and wherein the mass of seaweed is at least 100 kg, more preferably at least 500 kg and most preferably at least 1000 kg.

13 Claims, 3 Drawing Sheets

SEAWEED CULTIVATION METHOD AND SYSTEM

CROSS REFERENCE TO RELATED APPLICATIONS

This application is a national phase application of PCT/US2021/024129, filed 25 Mar. 2021, entitled SEAWEED CULTIVATION METHOD AND SYSTEM, which claims the benefit of European Patent Application No. 20167539.4, filed 1 Apr. 2020, entitled SEAWEED CULTIVATION METHOD AND SYSTEM which are hereby incorporated by reference in their entirety.

The present invention relates to a method and a system for cultivating seaweed and in particular for cultivating wild species of *Chondrus crispus, Sarcothalia crispata* (also known as *Gigartina* type sandpaper), or *Gigartina skottsbergii*. All three species are carageenophytic seaweed useful in the production of carrageenan polysaccharides and in particular of lambda carrageenan.

In the present context by "seaweed" is understood a macroscopic, multicellular, marine algae which can grow in the wild or can be farmed. Wild seaweeds typically grow in the benthic region of the sea or ocean without cultivation or care from humans. Farmed seaweeds are typically cultivated on various supports like ropes, fabrics, nets, tube-nets, etc., which are typically placed below the surface of the sea or ocean. Seaweeds may also be farmed in pools, ponds, tanks or reactors containing seawater and placed on the shore or inland. The term "seaweed" includes members of the red, brown and green seaweeds.

Carrageenan polysaccharides are grouped in three main types: kappa, iota and lambda carrageenan, which differ due to the molecular structure of the repeating galactose units of the polysaccharide. Kappa carrageenan forms strong gels and is a good water retainer. It is typically used as a vegan alternative to gelatine in the food industry when rigid gels are required, e.g. in milk desserts. Iota carrageenan typically forms less rigid gels, while lambda carrageenan is essentially non-gelling.

Lambda carrageenan is typically used as a thickener or viscosifier for example in cosmetics and dairy products due to its advantageous high solubility in cold water and/or milk. It can also be used as an emulsifier to provide for example a creamy texture to the final product. In particular lambda carrageenan is useful in the production of dairy beverages such as milkshakes, chocolate milks and the like. Lambda carrageenan may also have antioxidant and/or anticoagulant activities which lends it to both food and non-food uses.

Currently the carrageenan industry obtains its raw materials from warm sea farming or cultivation of the species *Kappaphycus alvarezii* and *Eucheuma denticulatum* producing kappa and iota carrageenan, respectively. The most used resources that produce lambda carrageenan are wild species like *Chondrus crispus, Sarcothalia crispata*, or *Gigartina skottsbergii*, which are challenging to farm and therefore currently extracted from natural meadows. While wild *Chondrus crispus* is abundant, its harvesting is labour-intensive and seasonal and finding sufficient labour to harvest it poses challenges which in turn leads to inability to meet the current and increasing demand for lambda carrageenan. Also while *Sarcothalia crispata* can be harvested from wild meadows it is not possible for workers to selectively harvest from the wild the seaweed phase containing predominantly the desired lambda carrageenan. There is therefore a need in the art to provide a farmable source of lambda carrageenan that is preferably sustainable over time.

There is also a need to be able to produce purer, industrial scale batches of lambda carrageenan.

To the inventors' knowledge there is no natural meadow or farming method currently able to deliver pure batches of lambda carrageenan on an industrial scale, e.g. batches containing preferably at least 90 wt %, more preferably at least 95 wt %, most preferably about 100% of lambda carrageenan based on dry weight, and having a batch dry weight (as measured at a moisture content of 14%) of at least 100 Kg, more preferably at least 500 Kg, most preferably at least 1000 Kg. While the details below refer mainly to *Sarcothalia crispata*, the same apply to the other lambda-carrageenan producing seaweeds e.g. *Chondrus crispus* and *Gigartina skottsbergii*. *Sarcothalia crispata* reproduces widely by spores. Previous studies, e.g. M. Hughes et al., "Spore release and germling development on different substrates in the carrageenophyte *Sarcothalia crispata* from the southwestern Atlantic coast" accepted for publication on September 2018 in Journal of Applied Phycology, have shown that a laboratory culture of *Sarcothalia crispata* is possible and that the seaweed could grow using known suspended farming systems if these have been inoculated with spores. Techniques have also been proposed such as inoculation of spores directly on natural substrates. However to date these proposals have not been implemented on commercial-scale aquaculture systems due to various difficulties occurring during scaling up the laboratory methods. One problem is that the lambda-carrageenan containing seaweed is highly seasonal and its fronds do not survive the winter season, at which time only the fixing discs of the seaweed remains. This limits the applicability of laboratory methods and makes scaling up difficult.

The present invention attempts to solve the above drawbacks by providing a method of cultivating carageenophytic seaweed on large scale. The method of the invention is able to provide industrial batches of pure lambda carrageenan.

The present invention provides a method of cultivating carageenophytic seaweed, the method comprising: a. providing a reproductive tissue of the seaweed, preferably fronds containing spores;
  b. releasing spores from the reproductive tissue by:
    (i) contacting the reproductive tissue with a non-saline aqueous solution;
    (ii) at least partially dehydrating the reproductive tissue;
    (iii) contacting said at least partially dehydrated tissue with a first saline solution to produce a spore-containing saline; and
    (iv) optionally filtering the spore-containing saline;
  c. adding the spore-containing saline to a container containing a second saline solution and a substrate and allowing the spores to settle on the substrate, wherein said substrate is at least partially immersed in said second saline solution;
  d. germinating spores on the substrate; and
  e. growing the seaweed from the germinated spores.

The reproductive tissue at step a. is preferably fronds obtained from a wild harvest. Preferably, the fronds are whole fronds presenting reproductive structures containing spores.

The present inventors have found that the non-saline water contact described at step b.(i) helps to render the cell walls of cystocarps fragile, which facilitates later high quantity spore release. In addition this step eliminates possible contaminants and unwanted organisms. Preferably, the non-saline water is fresh water or tap water and can also be potable water.

The inventors found that a filtering step b.(iv) is preferred, for removing impurities such as diatoms, thereby ensuring that the spore solution which is used to inoculate the substrate is as clean as possible.

The inventors found that the periods of time used for cleaning with fresh water, dehydration and osmotic shock (i.e. saline solution contact in step (ii)) provided superior results as compared with the prior art.

The first and the second saline solutions may have the same salt concentration and they preferably contain seawater, more preferably seawater extracted from the sea at the location where the seaweed will be farmed. Preferably, the seawater has been filtered and sterilized as will be described later. The salinity of the saline solutions may preferably match the salinity of natural seawater in the local region from where the fronds have been harvested. The salinity is therefore preferably 2-6%, more preferably 3-5%, yet more preferably 3-4% and most preferably 3.1-3.8% or 3.5% salt. By salinity is herein understood the amount of salts contained by 1 Kg of water (expressed in %).

The temperatures of the saline solutions described and claimed herein are preferably between 10 and 14 degrees C. and most preferably between 10 and 12 degrees C.

The method of the invention includes at step b.(i), contacting the seaweed's reproductive tissue with non-saline aqueous solution, e.g. a solution comprising water and containing no salt or as little salt as possible, e.g. at most 3.5 wt %, preferably at most 3.0 wt % salt relative to the total weight of the non-saline water. Most preferably, the non-saline aqueous solution contains a total amount of solid residue of at most 1.5 g/L, more preferably at most 1.0 g/L, most preferably at most 0.7 g/L. The total amount of solid residue can be measured by evaporating 1 L of water to dryness and weighing the solid residue. The solid residue contains salts, e.g. sodium, potassium, calcium, magnesium, chloride, sulphate, bicarbonate, carbonate and/or nitrate salts. Preferably the reproductive tissue is contacted with this non-saline aqueous solution for up to one hour and preferably for at most 30 minutes, more preferably at most 15 minutes, even more preferably at most 5 minutes, most preferably between 15 seconds and 3 minutes. In practice this contact may be carried out by submerging or soaking the reproductive tissue in the non-saline aqueous solution at least once, from 2-3 times, or more. The inventors surprisingly found that this step of fresh water treatment enhanced further the spore release mechanism.

In step b(ii) the reproductive tissue is at least partially dehydrated. Preferably, the amount of moisture contained by said tissue is at most 95 wt %, more preferably at most 85 wt %, most preferably at most 75 wt %. Any dehydrating method can be used, e.g. drying in an oven, in the sun, or in ventilated spaces, or using water absorbing paper.

In step b(iii) the spores are released from the partially dehydrated tissue by subjecting said tissue to an osmotic shock. The osmotic shock is effected by contacting said at least partially dehydrated tissue with a first saline solution. The ratio of first saline solution to partially dehydrated tissue is preferably up to 5 kg, more preferably 1 to 3 kg and most preferably about 2 kg tissue per 10 L saline solution. In practice the tissue may be dipped in a container which contains 10 L of saline solution.

Preferably contacting of said at least partially dehydrated tissue with the first saline solution is effected over a period of time sufficient to produce a spore-containing saline (in step b.) having a spore concentration of at least 10 million spores per litre, more preferably at least 30 million spores per litre, most preferably at least 50 million spores per litre. Preferably, the concentration of said spores is between 50 and 90 million spores per litre, more preferably between 55 and 75 million spores per litre, most preferably between 60 and 70 million spores per litre.

In case that it is found that the concentration of spores is not sufficiently high, this may be due to the reproductive tissue being of insufficient maturity. If this is the case then the process can be started again using more mature reproductive tissue e.g. several days after the first reproductive tissue was harvested.

At step c. of the invention, the substrate is contacted with the spore-containing saline causing the spores to settle on the substrate. To ensure an efficient contact between said substrate and the spore-containing saline, said substrate is preferably at least partially, more preferably fully, immersed in a container containing a second saline solution and the spore-containing solution is added to said second saline solution. Preferably, said solution is added to ensure a homogeneous distribution of spores in the container. Preferably, the amount of second saline solution in the container is adjusted to yield a spore concentration after the addition of the spore-containing saline of at least 2.5 million/litre, more preferably at least 3.5 million/litre, most preferably at least 4.5 million/litre. Preferably, the spore concentration in the container is between 2.5 and 10 million/litre, more preferably between 3.5 and 7.5 million/litre, most preferably between 4.5 and 5.5 million/litre. Adjusting the sport concentration at the above mentioned levels, ensures an efficient spore germination.

Any substrate can be used, e.g. fabrics, ropes, panels, any object of definite or indefinite shape. Preferably the substrate is a yarn, a rope or a net. A yarn is an elongated body containing a plurality of filaments while a rope is an elongated body containing a plurality of yarns. The rope may be laid, twisted or braided. A net is typically formed by ropes joined at intervals to form a mesh. Preferably said yarn is a synthetic yarn and preferably the rope is constructed from said synthetic yarns. The synthetic yarns are yarns whose filaments are made of a polymer, most preferred polymers being polyethylene, polypropylene, polyester, polyaramid and polyamides. Preferably the substrate is a net, wherein the mesh of said net has openings with a diameter (the largest dimension of the opening measured when the net is suspended under water and without any load applied on the net) of at least 5 mm. Preferably, said net is constructed from ropes containing polyamide (e.g. nylon) ropes. In tests the inventors found this type of net is suited to the germination of spores. These concentrations have been found to strike a balance between high rates of germination on the substrate and reduced spore mortality.

Advantageously the substrate, prior to use, is washed with non-saline water and sterilized, e.g. with boiling or near-boiling water. Preferably, any chemicals present on the substrate (e.g. anti-fouling compounds) are removed prior to spore fixation. However this step may not be necessary where the substrate has not previously been treated with any chemicals.

Advantageously the number of spores germinated on the substrate at step d. is at least 50, more preferably at least 100, even more preferably at least 150 per linear centimetre of substrate. Most preferably the number of spores germinated on the substrate is at least 500 per linear centimetre substrate. These levels of germinated spores ensure a high yield of seaweed, in particular when transferring the substrate to the open sea. The present inventors have found that the method and system described herein provides these high levels of germinated spores due to the method's ability to release high quantities of spores, the quality of those spores (observable using a microscope) and the described density of spores used for inoculating the substrate. The invention provides a high level of spore germination on the substrate as well as a low spore mortality rate.

Conveniently the reproductive tissue is harvested from *Sarcothalia crispata*, although the invention can be used for other types of seaweed including *Chondrus crispus* or *Gigartina skottsbergii*. Preferably, when the seaweed is *Sarcothalia crispata*, the seaweed reproductive tissue is obtained from the cystocarpic phase of the seaweed as described below.

The cystocarpic phase produces carpospores which germinate to produce the tetrasporophytic phase. Fronds of this phase contain lambda carrageenan which is particularly desirable in the food industry.

The invention also provides a system for cultivating seaweed, the system comprising:

an apparatus for releasing spores from seaweed reproductive tissue to produce a spore-containing saline, the apparatus comprising a non-saline aqueous solution station for contacting the seaweed reproductive tissue with a non-saline aqueous solution, a dehydrating station for at least partially dehydrating the seaweed reproductive tissue, a saline solution station for contacting the seaweed reproductive tissue with a first saline solution and optionally at least one filter;

a substrate for germination of the spores;

a container for a second saline solution to at least partially immerse the substrate for contacting the substrate with the spore-containing saline and germination of the spores; and a growing station for growing the seaweed from the spores.

Reproducing seaweeds such as *Sarcothalia crispata* via spores using the present invention has several advantages which have been noted by the inventors, including but not limited to the following:

a reproductive frond can produce and release thousands of spores meaning that the reproductive potential of the seaweed is very high;

therefore starting from a relatively small amount of reproductive material, a user of the invention can cultivate a large quantity of seaweed;

the spores sit easily on artificial substrates preferably washed to remove chemical substances;

the growth of seaweed from spores happens relatively fast in open sea leading to harvestable seaweed within 4 to 5 months;

The cultivation of carageenophytic species allows the user of the invention to select the type of frond to be harvested depending on the need of the food industry and the particular carrageenan which is required to be extracted, as will be explained further below.

Aspects of the invention will now be described, without being however limited thereto, with reference to *Sarcothalia crispata* and the appended drawings, in which.

*SARCOTHALIA CRISPATA* LIFE CYCLE

Figure 1:
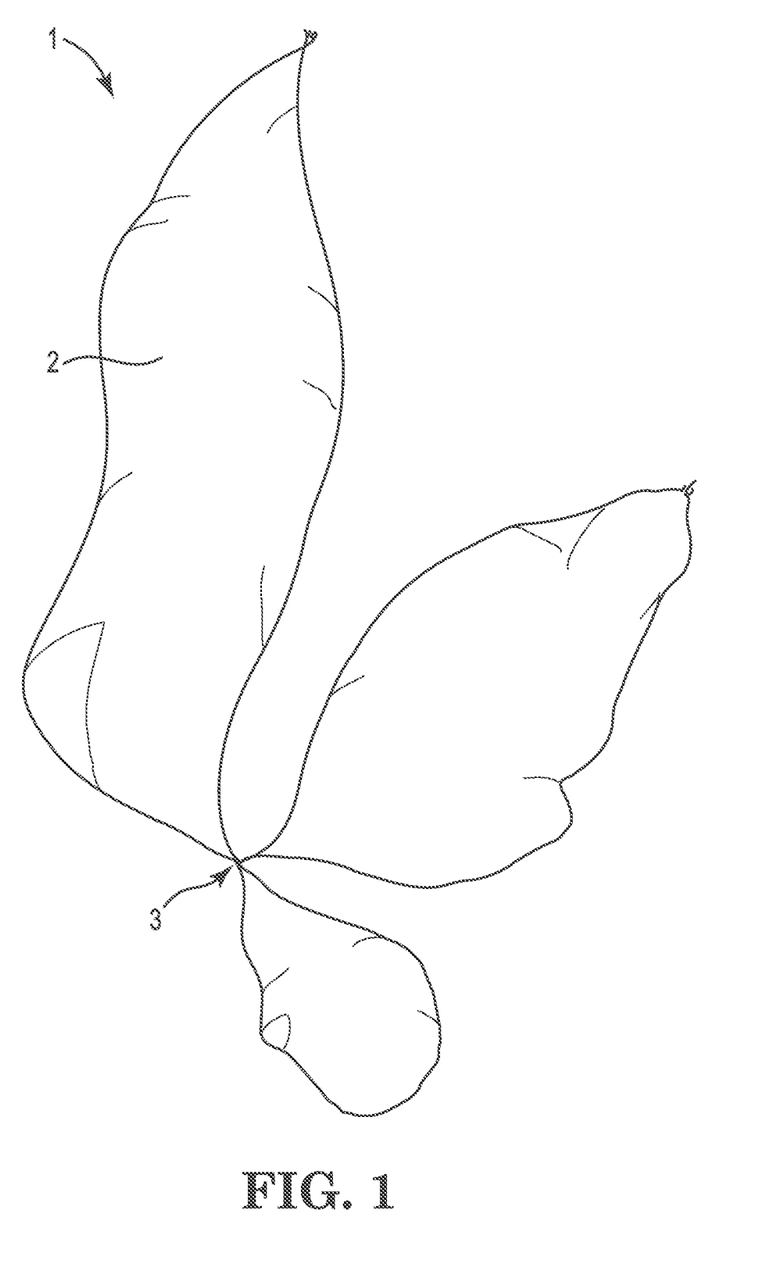
FIG. 1 is a representation of a mature example of *Sarcothalia crispata*.

*Sarcothalia crispata* is a laminar seaweed i.e. having a blade-like structure that is typically distributed from the lower intertidal to the subtidal zones of the sea, to depths of about 10 m and which is abundant in natural protected environments and semi-protected waters (i.e. primarily not in the open sea) and which grows on hard substrates such as rocks or mollusc shells, forming extensive meadows. A schematic drawing of an example 1 of the species is shown in FIG. 1. The fronds 2 of this seaweed are reddish purple to reddish brown with a variable size that can reach up to 1.5 m in length. The seaweed is fixed to the substrate by a small basal disc 3 from which a short stoma develops with one or several broad, orbicular lamina that reach different sizes. The seaweed may present small proliferations on the edge of the frond that resemble cilia characteristic of the species. It presents a three-phase isomorphic life cycle and is mostly endemic to the coasts of Chile and Argentina. For example in Chile the species is distributed from latitudes 36° S to 54° S.

The natural meadows of *Sarcothalia crispata* show seasonal variations in biomass and density meaning that the mass and therefore density of seaweed present in the meadow changes throughout the year. During the summer in the Southern Hemisphere (months of January to March) the maximum amounts of biomasses are observed. These reduce in autumn (months of April to June) and reach minimum levels in winter (months of July to September) and spring (months of October to December). Later in the late spring and early summer the biomass begins to regenerate. The decrease in the biomass's amounts of this resource in late autumn) or winter is associated with the maturity of reproductive fronds and massive release of spores which is typically followed by subsequent tissue necrosis and fragmentation of the fronds. The fronds of this species are therefore of a seasonal occurrence whereas the basal discs survive for typically more than two years and in the following season are able to regenerate biomass again in the meadow. In relation to the maturation of phases in the natural meadows during summer the biomass is mainly vegetative.

Figure 2:
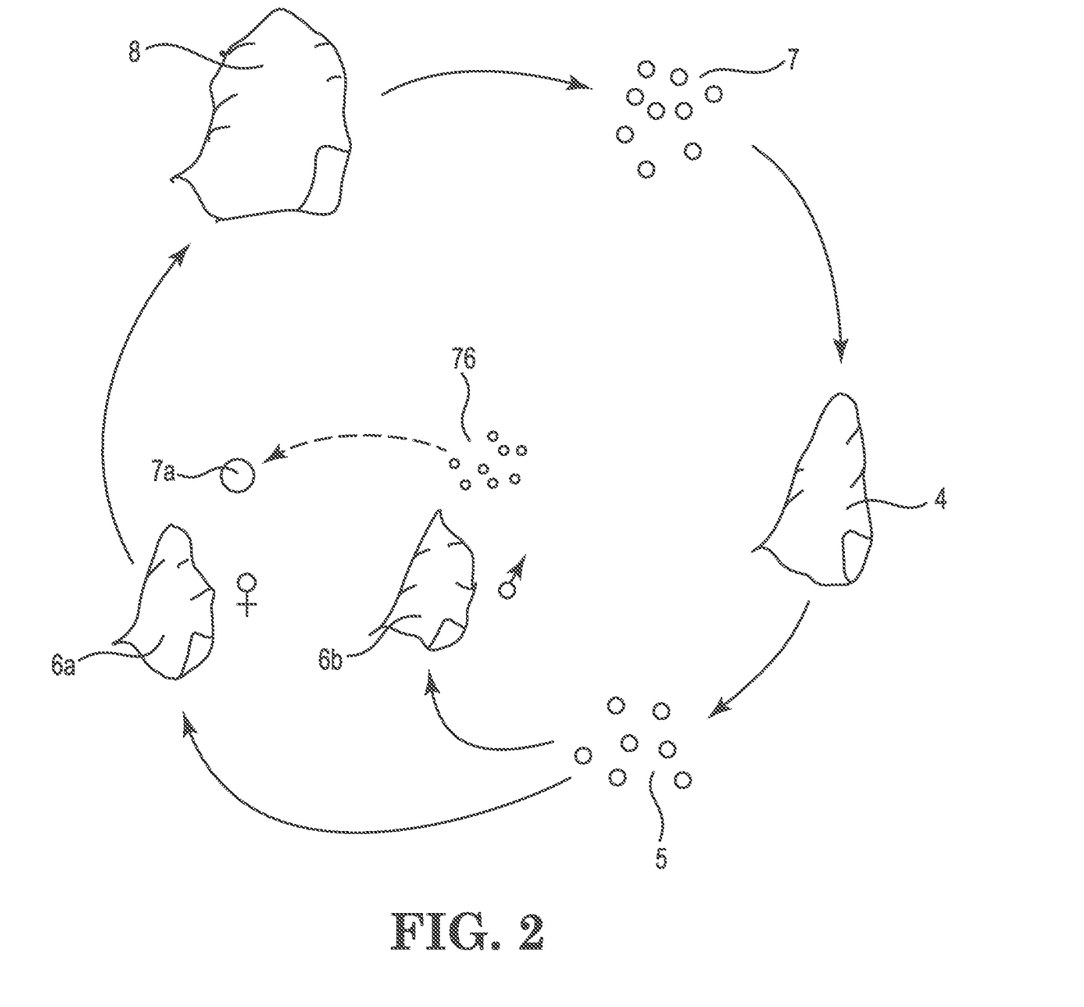
FIG. 2 depicts a schematic of the life cycle of *Sarcothalia crispata*.

The life cycle of *Sarcothalia crispata* is illustrated in FIG. 2. Starting from the right-hand side of FIG. 2 is shown a tetrasporic frond 4 (also known as a tetrasporophyte) which is diploid (2*n*) i.e. containing 2 sets of chromosomes per cell The mature tetrasporophytic phase of the seaweed forms tetrasporangial sori which produce haploid (n) tetraspores 5 by meiosis, having an average size of 20 µm. These tetraspores 5 germinate on contact with a substrate to form gametophytes having fronds, wherein the gametophytes may be female 6*a* or male 6*b*.

The female gametophyte 6*a* develops reproductive structures in its fronds having female gametes 7*a*. Release of male gametes 7*b* from the male gametophyte 6*b* leads to fertilization (indicated by the dotted line in FIG. 2). The fertilized female gamete is known as the carposporophyte (2*n*) and this lives together as an envelope with the female gametophyte in what is then known as the cystocarp 8 having cystocarpic fronds. Next the carposporophyte releases carpospores 9 (2*n*) having an average size of 22 µm which germinate to produce the tetrasporophyte 4, thereby closing the life cycle.

Thus in the natural meadow it is possible to find individuals from all three phases (tetrasporophytic, gametophytic and carposporophytic) at the same time and there is not necessarily a strict segregation of the three phases. However it has been found in the wild that more than 75% of the meadow can consist of gametophytic fronds and carposporophytic fronds. Those fronds are isomorphic, except when showing reproductive structure.

The life cycle is important to the present invention because the difference phases of the seaweed give rise to fronds containing the different carrageenans. The gametophyte fronds 6a and 6b contain kappa and iota carrageenans. The tetrasporic fronds 4 predominantly contain lambda carrageenan. Therefore as part of the invention, one can sow for a particular type of frond depending on which type of carrageenan is required. Advantageously if the market requires lambda carrageenan then the invention may be used to cultivate tetrasporic fronds 4 by germinating carpospores 9. As explained later this will require the initial gathering of cystocarpic fronds 8 to provide carpospores 9.

The present invention relates to a novel method and system for cultivating seaweeds for the production of carrageenans and in particular for the cultivation of *Sarcothalia crispata*. While methods for seaweed cultivation are known in the art, the present inventors found that these were not suitable for growing large volumes and therefor failed for the cultivation of *Sarcothalia crispata*. The present inventors developed novel techniques for producing high density crops leading to larger harvests of higher quality fronds than previously known in the art. This leads to higher yields of carageenans, especially lambda carrageenan, having higher purity than previously achieved.

In general the method of the present invention involves two major parts: firstly, in the hatchery, insemination of a substrate with spores followed secondly by growth of the seaweed in the open sea. The method and system of the invention will now be described with reference to a preferred manner of proceeding.

However it is to be appreciated that the invention is defined by the claims and may preferably not be seen as being limited to the specific method described below, which is presented as just one way of performing the invention.

Selection of Substrate

One of the first problems solved by the inventors of the present application was to find the most suitable substrate that allows for a sufficient density of discs or seedlings to be achieved for the subsequent success of the cultured seaweed in the sea. For convenience the inventors have used fishing nets as substrates because they are relatively inexpensive and are readily available in the aquaculture industry. In developing the present invention, the inventors tested three types of fishing nets, commonly used in the salmon farming industry, as artificial substrates.

In general, nets for use as a substrate in the present invention may have a mesh size of greater than zero to 2 cm, preferably 1 mm to 1.5 cm, more preferably 4 mm to 1.1 cm and most preferably 5 mm to 1 cm. The mesh size here refers to the diameter of the woven or monofilament thread making up the grid of the net. In general the aperture size (size of the openings in the grid) may be greater than zero and up to 15 cm, preferably up to 10 cm or 11 cm, more preferably 5 cm to 8 cm and most preferably 2 inch (5.08 cm) or 4 inch (10.16 cm).

Advantageously the thread or threads making up the net may be synthetic materials comprising polypropylene and/or nylon and/or polyethylene in any proportions, for example 50% each of any two of the listed plastics, 100% of any one of the listed plastics or 33% each of all three listed plastics. Particularly preferred substrates comprise nylon and polypropylene, preferably in ratios of 50:50, 40:60 or 30:70 of each plastic. It may also be preferred to have a substrate comprising substantially 100% nylon or polypropylene. Alternatively the thread or threads may comprise a non-synthetic material such as sisal, hemp, jute or cotton. In practice the substrate may be any suitable material which permits the germination of sporelings.

The first net tested by the inventors was a thick mesh with 1 cm diameter and 4 inch openings that was made of 50% nylon and 50% polypropylene with a smooth and knotted seam. The second tested net had 5 mm diameter mesh and about 10 cm openings, made of nylon and polypropylene with a smooth seam and knot. The third tested net had about 5 cm aperture, mesh with 5 mm diameter and produced of nylon only with no knots. In practice, the inventors found that a nylon net having a 4 to 15 cm opening worked best for the germination of the seaweed. This kind of net showed the best spore fixation and additionally allows for adequate flow of water through the net when the net is transferred to the sea, for growth of the seaweed. Nevertheless the other types of net tested were also adequate. An advantage of using fishing net as substrate is that it is reusable and can be used from one season to the next. Additionally such nets are already commercially available on the market meaning that special substrates do not need to be developed and purchased.

Preparation of the Substrate

It is common for a brand new substrate such as fishing net to contain chemicals within the threads of the net from part of the manufacturing process. The present inventors found that it is advantageous for the success of the seaweed cultivation that the substrate be washed thoroughly before use to remove any unwanted chemicals.

In accordance with one aspect of the present invention, the substrate may preferably be prepared for use by washing it repeatedly with fresh (non-saline) water to release any chemical substances from the substrate matrix. After washing, the fresh water may preferably be replaced to remove chemical impurities and the process may preferably be repeated for at least three to four days. Then the substrate may preferably be sterilised by mixing repeatedly for at least 3 minutes with water which was previously boiled or which is boiling. The substrate may then be dried, for example hung for five days outdoors to dry, in a controlled place away from environmental contaminants.

Preparation of Hatchery Ponds

In order to carry out large-scale sowing of seaweed such as *Sarcothalia crispata*, it is preferred to use hatchery ponds as containers since such ponds can contain a large amount of artificial substrate and maintain conditions of temperature, salinity and oxygen and light in a controlled manner as explained below. The ponds may preferably be lightweight to facilitate easy handling and may preferably be white so that the operator can know if the pond is clean. In this regard ponds made from fiberglass materials (typical thickness of 3 mm or 4 mm) are very suitable. The ponds may preferably be cleaned in use every seven days in which case the substrates are temporarily removed and placed in containers of filtered and UV-sterilized seawater until the ponds are ready to be used again. The ponds may preferably not be washed using chlorinated solutions because the inventors found that this will hinder the development of the spores. The chlorine level of washing solutions is preferably zero but may be up to between 1 and 3 ppm.

Collection of Mature Reproductive Biomass

In order to begin the process of sowing the artificial substrate a first step is to harvest seaweed reproductive tissue from an existing meadow in the open sea. This may preferably done from an area of the sea as close to the hatchery as possible because, the more distant the extraction site and the hatchery, the greater the degree of decomposition of the fronds might be. The transfer time between extraction and hatchery may preferably not be more than 10 hours, more preferably at most 7 hours, even more preferably at most 5 hours, most preferably at most 3 hours. The inventors found that the most advantageous time of year for frond collection is June to mid-August though in principle the invention can be worked at any time that reproductive tissue is available in the wild. As an alternative to harvesting reproductive tissue from the open sea it is to be appreciated that the reproductive tissue could also be obtained from an artificial environment e.g. seaweed growing in a tank or pond.

As previously mentioned, in an advantageous aspect of the invention the reproductive tissue to be used are cystocarpic fronds 8 which release carpospores 9 leading to tetrasporic fronds 4 containing lambda carrageenan. Thus the individual diver collecting these cystocarpic fronds 8 from the sea may preferably be able to identify them and also identify that they are in a mature reproductive state. A trained diver is able to distinguish by eye cystocarps from tetraspores, when the seaweed is mature and reproductive structures are visible. The diver harvests fronds by cutting the frond and leaving the basal disc in place the meadow. This is a sustainable practice and also prevents impurities being brought with the harvested seaweed.

Once harvested the reproducing tissue is preferably protected from the sun, from drying and from rain for example in a polystyrene container. Damage by sun/rain/drying might lead to poor spore release and resultant poor yield of seaweed.

Once harvested a further selection of the collected fronds may be made, to choose the best reproductive material. Ideally the selected fronds may preferably be greater than 10 cm, more preferably at least 20 cm, most preferably at least 30 cm in length and may preferably not present any damage or necrosis. Additionally the reproductive tissue may preferably be free from endophytes for example bacteria or fungi which are observed as dark spots on the tissue; these may best be identified by viewing the tissue in sunlight.

Once transported to the hatchery the reproductive tissue is collected in a container, e.g. a pond, and is washed preferably with filtered (1 micron mesh) and UV-sterilized seawater to remove impurities (sand, herbivores, algae and other organisms which may be commonly attached to said tissue). For use in the next stage (sporulation) whole fronds may preferably be selected as reproductive tissue with abundant numbers of reproductive structures and in an evident state of maturity, clean and with minimal necrosis. The selected fronds may preferably not show endophytes in the lamina and the whole area of the fronds may preferably present reproductive structures (cystocarps). The fronds may preferably not show any signs of necrosis because this may contaminate the rest of the container. Additionally in a frond with necrosis the spores may not be fully viable.

Ideally the selected fronds may preferably be used for the next stage of sporulation immediately after collection or as soon as practically possible—for example up to 6 hours but preferably up to 4 hours or more preferably up to 2 or 1 hours from harvest. However if necessary, the fronds can be left for up to 24 hours in a container of filtered and disinfected seawater with constant aeration or preferably in an insulated container (e.g. polystyrene) without additional water. After that time it is not advisable to use the fronds for sporulation because the density as well as the viability of spores may have been reduced.

Spore Release (Sporulation)

The present inventors have found that, good yields of spores and therefore a good crop of seaweed, may be obtained by controlling several environmental factors such as saline temperature in the container, salinity of water (which is preferably seawater), oxygen content of saline, light intensity and light quality i.e. the spectral distribution of the light (combination of wavelengths) which preferably matches natural sunlight as far as is possible. Additionally, it is preferred that the stocking of germinating spores in the containers is not too high, to avoid mortality and to favour growth.

Nutrients may be added to the container to boost growth. The inventors have found that a nutrient composition providing between 3000 and 15 000 mg/L, more preferably between 5000 and 8000 mg/L available phosphate (e.g. 5000-7500 mg/L P), between 50 and 1000 mg/L, preferably between 100 and 500 mg/L available potash (e.g. 100-300 mg/L K) and between 0.01 and 1 mg/L, preferably between 0.1 and 0.5 mg/L available nitrogen (e.g. 0.2-0.4 mg/L N) is suitable for use with the invention.

The salinity of the water may preferably match the salinity of natural seawater in the local region from where the fronds have been harvested. Ideally the water to be used may be natural seawater which is preferably sterilised as described herein. The salinity is therefore preferably 2-6%, more preferably 3-5%, yet more preferably 3-4% and most preferably 3.1-3.8% or 3.5%. In general oxygen content may be 1-10 ppm dissolved oxygen, or 3-9 ppm and preferably above 6 ppm, 7 ppm or 9 ppm dissolved oxygen. The dissolved oxygen can be measured by using a well known and widely commercially available dissolved oxygen meter. These salinity and oxygen parameters are applicable to all saline waters mentioned in this specification. The temperatures of the saline in the container preferably are kept in range between 6° ° C. to 16° C., preferably 10-14° C. and most preferably 10-12° C.

Concerning physical factors, as already mentioned it is important that the hatchery be as close as possible to the sea so as to minimise the time between harvesting reproductive tissue and sporulation. Moreover the sea is preferable as a source of seawater for the containers. Before being used in the containers and in the other processes described herein the seawater may preferably filtered with one or more, and preferably two filters, optionally having a mesh size of 0.5-2.0 or around 1 μm and sterilised using an ultraviolet source to eliminate bacteria and protozoa. When sterilisation of seawater is mentioned in this specification it is to be appreciated that these parameters of filter and UV are also intended.

There is now described the process of obtaining spores form the harvested reproductive tissues. Before the present invention it was known in the art to obtain a spore-containing liquid from mature fronds of the carposporophytic phase by methods involving dehydration of the fronds, applied osmotic shock, sieving of the spore-containing liquid and spore count. During development of the present invention the inventors tested several traditional methods of spore release but these were not successful in providing high concentrations of viable spores.

While methods known in the art may potentially release spores from reproductive tissue the success of spore settling and germination of the disc is very low on the substrates used.

Accordingly a method and system according to the invention which will be described below is an improvement over the prior art techniques, generally providing over 70 million spores per kilogram of reproductive tissue, with the spores being of far better quality than prior art techniques. The spores obtained using the invention are highly viable and have an intense reddish colour, a spherical shape and substantially without irregularities. Provision of better viability spores may ensure a higher probability of settlement on the substrates used and reduces the contamination of protozoa and bacteria resulting from mortality of non-viable spores.

Thus, the sporulation methods used in the present method not only provides a high density of spores (i.e. large number of spores per kilogram of reproducing tissue) but also a high quality of spore.

In general, the inventive sporulation method provides a reproductive tissue by removing the fixing discs of reproductive fronds from the mature reproductive seaweed before cleaning the fronds to eliminate epiphytes.

In the method of the invention the reproductive tissue and in particular the fronds are firstly soaked in a container with fresh water, instead of saline water/seawater, for example for anything up to 1 hour and preferably for at least 1 minute, more preferably at least 5 minutes, most preferably between 1 and 30 minutes. This step may involve soaking or dunking the seaweed in the fresh water at least once, or up to 2-3 times or more, rather than an permanent immersion in water. The inventors have surprisingly found that this step helps to facilitate liberation of the spores. Second, the reproductive tissue and in particularly the fronds are at least partially dehydrated by removing moisture therefrom, e.g. by using absorbent paper and placing the fronds on a table covered with the absorbing paper to dehydrate the fronds. This step is preferably performed for at least 5 minutes, more preferably at least 15 minutes, most preferably at least 30 minutes. Preferably, the dehydrating step is carried out for at most 1 hour. Preferably, at least 5 wt % of the water is removed from the soaked fronds, more preferably at least 10 wt % water, most preferably at least 25 wt % water.

After dehydration, the inventors apply an osmotic shock that breaks the laminar tissue and causes the release of spores (sporulation) by soaking the dehydrated seaweed in a container with a first saline solution for a time of at least 15 minutes, more preferably at least 30 minutes, most preferably at least 1 hour, so spores can be released. The reproductive tissue may also be pressed by hand in order to release as many spores as possible from the tissue, before the reproductive tissue is removed to leave a spore-containing liquid.

Once the spore-containing liquid is obtained it may be filtered to remove impurities and tissue debris. The average size of the spores of *Sarcothalia crispata* is 19 to 22 µm. Therefore, for example, a sieve having a pore size of 44 or 45 µm allows the spores to pass while retaining debris. More than one sieve may be used, for example two sieves.

As an optional step in the process of the invention the spore-containing liquid may be sampled to check spore density. An aliquot of spore-containing liquid may be removed from the main batch of spore-containing liquid and the state of the spores (colour and shape) may be viewed under a microscope. A good condition spore which is viable for growing and is not dead presents an orange colour and spherical shape. The spores may be counted for example using a Sedgewick Rafter counting chamber which is used to count particles and microorganisms in one millilitre of water or other transparent liquids. This way a number of spores per millilitre can be counted and provided. The inventors have found that a particularly advantageous spore count for the invention is 20-100 million spores per litre, preferably 40-80, more preferably 50-70 and most preferably 60-65 million spores per litre i.e. 60,000-65,000 spores per millilitre. If the spore count is greater than the maximum range ends disclosed then the spore-containing liquid may be diluted in a manner known in the art, advantageously to the most preferred range. The preferred spore count can be reached by processing an appropriate amount of reproducing tissue, which can be routinely determined once the targeted amount of spores is known.

Inoculation of Substrates

Following the provision of the spore-containing saline solution, the solution is poured on the substrates (e.g. fishing nets previously described) that are arranged in containers in the hatchery. The substrates have already been prepared as described above. In this regard the substrates are placed in tanks filled with a second saline solution, preferably seawater. The spore-containing saline is stirred or shaken to obtain a homogeneous spore distribution throughout the saline because the spores tend to settle at the bottom of the solution. The shaken or stirred spore-containing saline is then poured over the substrate and preferably a nutrient is added to the seawater, for example 1 ml liquid nutrient per litre seawater. The inventors have found that best results are achieved if the substrates are inoculated as soon as possible after spore release but preferably within 2 hours, more preferably within 1 hour and most preferably within 30 mins of spore release.

Figure 3:
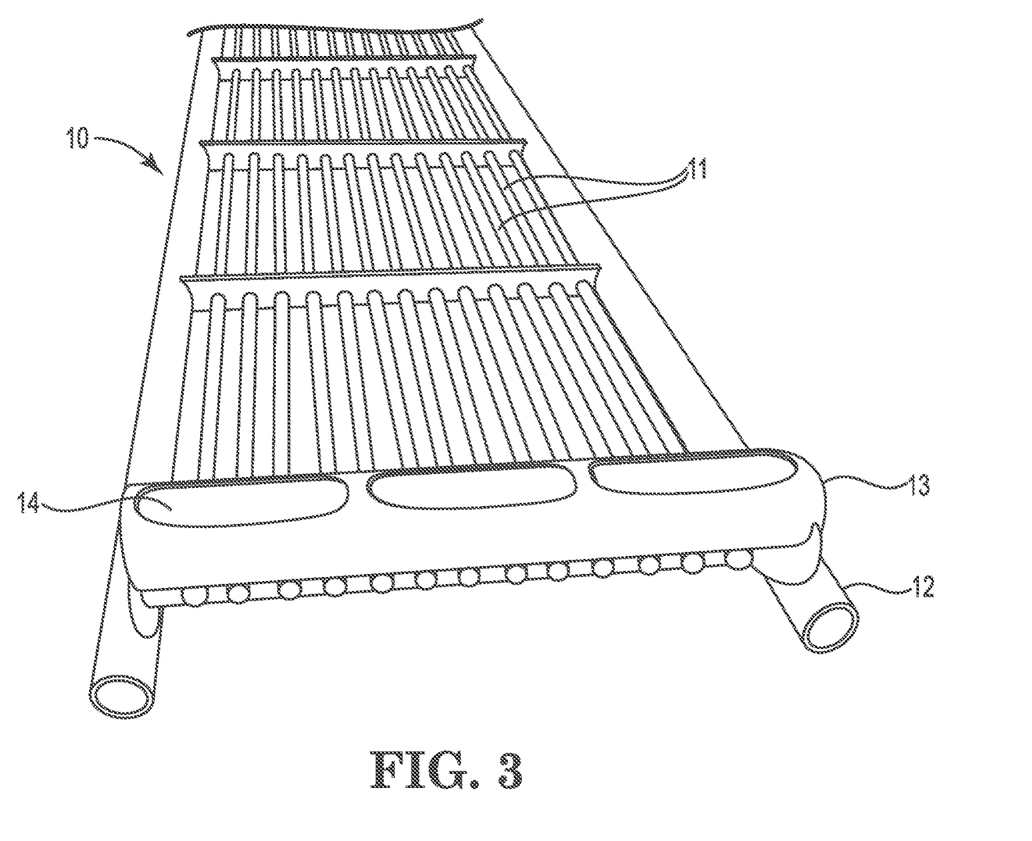
FIG. 3 depicts sowing equipment for use with the invention.

To add the spore solution to the container in a homogeneous manner the inventors developed the sower 10 depicted in FIG. 3. The sower 10 includes a frame 12 supporting a series of parallel tubes 11, all of which present holes on their lower surfaces (not shown) to allow passage through of spore solution. The solution is poured into holding tank 13 via openings 14 and passes through tubes 11, where it is deposited through the holes and into the container.

Concerning the concentration of spores in the tanks the inventors have found that suitable values are 1,000 million to 10,000 million spores per 500 L water saline, preferably 1,500 million to 8,000 million spores, more preferably 2,000 million to 6,000 million spores, most preferably between 2,100 million to 4000 million or 2,400 million to 2,600 million spores per 500 L saline. Table 1 shows the average amount of dry harvested biomass per substrate where the substrates are nets having 2 m×4 m in area based on spore concentration in the water of the hatchery tanks (each tank holding 500 L saline).

TABLE 1

Number of spores per 500 L tank (left column) against average dry harvested fronds per 2m × 4m net in kg (right column).

| | |
|---|---|
| 1 750 500 000 | 2.23 |
| 1 800 500 000 | 1.58 |
| 1 838 500 000 | 0.45 |
| 1 875 000 000 | 0.85 |
| 2 087 000 000 | 1.51 |
| 2 122 000 000 | 3.40 |
| 2 128 500 000 | 2.08 |
| 2 154 000 000 | 2.63 |
| 2 166 000 000 | 2.40 |
| 2 225 500 000 | 2.69 |
| 2 297 000 000 | 1.65 |
| 2 381 500 000 | 3.16 |
| 2 398 000 000 | 1.96 |
| 2 417 500 000 | 2.64 |
| 2 434 000 000 | 2.39 |
| 2 465 500 000 | 2.16 |
| 2 496 000 000 | 2.42 |
| 2 555 500 000 | — |
| 2 575 500 000 | 4.29 |
| 2 607 000 000 | 11.78 |
| 2 669 500 000 | 1.20 |
| 2 710 500 000 | 1.36 |

The inoculated substrate is left in a resting state (without replacement of saline or nutrient and without air addition) preferably for at least 1 day, more preferably at least 3 days, most preferably from 5 to 7 days. After this inoculation period it is advantageous to replace the saline and nutrient in the container. The temperature of the saline may preferably be kept as at least 6° ° C., and preferably 6-16° C., more preferably 10-14° C. and most preferably 10-12° C.

During the inoculation period, the light conditions may preferably be a ratio of 8:16 hours light:darkness.

After the inoculation period, the biological state of the spores is preferably observed by sampling and using a microscope. Also after the inoculation period it is preferable to change the water and nutrient in the container. If during sampling a high presence of organisms e.g. diatoms is observed it is preferable to add an amount of steriliser e.g. germanium dioxide at a concentration of 2 ml per litre, to remain in the water for a time of 48 hours before replacing the seawater and nutrients again.

After the inoculation period, the substrate is kept in the container for at least 1 day, more preferably at least 5 days, even more preferably at least 15 days, most preferably at least 20 days. Subsequently, the substrates may be washed gently to avoid proliferation or increase of diatoms or other epiphytes. Washing of the substrate may be achieved by removing the substrate from the container and placing them in containers filled with filtered seawater (e.g. 1 micron filtering and sterilised with ultraviolet radiation). The inventors found that this kind of washing does not damage the fixing discs that are well-attached to the substrate. Advantageously the containers used for inoculation can be cleaned at the same time as the substrates are cleaned to avoid unnecessary disturbance.

Concerning abiotic factors, the inventors have found that the temperature of the saline solution in the container may preferably be between 10 to 14ºC. Salinity may preferably be between 30 to 33 ppm salt. Oxygen may preferably be between 5 to 8 mg/l saline. The light intensity may preferably be around 25 to 55 PPFD ($\mu$mol m$^{-2}$ s$^{-1}$). In case the temperature of the seawater increases beyond the advised limits, the saline may preferably be refilled every three to four days.

Finally it is advantageous that the fixing disc density of the sown substrates is at least 150 discs per linear centimetre of substrate before transfer to the sea and preferably at least 200 or 250 discs per centimetre. The inventors found that this density of discs provides a high enough density of seedlings in the sea to yield a high crop of seaweed. Most preferably a value of at least 500 discs per linear centimetre guarantees a high productivity in the cultivated seaweed. Table 2 shows the results of number of discs per linear centimetre against average dry yield of seaweed.

TABLE 2

Number of discs per linear cm substrate (left column) against average dry seaweed yielded in kg, from a 2m × 4m area net (right column).

| | |
|---|---|
| 59 | — |
| 79 | 1.20 |
| 101 | 4.29 |
| 117 | 2.08 |
| 123 | 3.40 |
| 155 | 1.36 |
| 166 | 1.51 |
| 244 | 2.42 |
| 251 | 2.16 |
| 281 | 0.45 |
| 297 | 2.63 |

TABLE 2-continued

Number of discs per linear cm substrate (left column) against average dry seaweed yielded in kg, from a 2m × 4m area net (right column).

| | |
|---|---|
| 323 | 1.65 |
| 344 | 11.78 |
| 378 | 2.23 |
| 400 | 1.96 |
| 430 | 2.40 |
| 450 | 2.39 |
| 526 | 2.64 |
| 536 | 2.69 |
| 572 | 3.16 |

Transfer of Sown Substrates to the Sea

After germination of the spores, the sown substrates can be transferred to the sea. This may preferably only be completed after the seedlings present erect axes. The substrates may be removed from the containers and transported to the sea. Then the substrates may be tied to a known cropping system at a depth of preferably between 1 m and 3 m under the surface of the water. For good growth it is also important to establish the crop in an area with sufficient water motion as well as water clarity. In around four to five months the inventors have found that harvestable fronds will be present within the seaweed.

Using the methods of the invention the inventors have been able to achieve yields of, on average 0.4 kg dry seaweed mass per m$^2$ net and up to 1 kg/m$^2$.

Results

Carrageenan was extracted from the harvested tetrasporophyte fronds of *Sarcothalia crispata* produced by the invention and prepared for analysis using a method adapted from "Hybridicity of carrageenans water—and alkali-extracted from *Chondracanthus chamissoi*, *Mazzaella laminaroides*, *Sarcothalia crispata*, and *Sarcothalia radula*" J appl. Phycol (2011) 23:105-114 Diane Jouanneau, Patrick Boulanguer, Jacques Mazoyer, William Helbert.

The carrageenan samples were analysed using $^1$H-NMR, assuming 100% potassium as the counter ion. As shown in table 3 below the samples predominantly comprise carrageenans from the lambda family (lambda and ksi; each column represents a carrageenan family member, with contents in percent). The $^1$H-NMR results in mass %, each carrageenan fraction is expressed versus the total of carrageenan. This demonstrates the ability of the methods and systems of the present invention to yield high purity lambda carrageenan extracted from seaweed.

TABLE 3

| lambda | nu | ksi | tau | mu | kappa | beta | Lambda + ksi = lambda family |
|---|---|---|---|---|---|---|---|
| 88.1 | 7.5 | 3.5 | 0.4 | 0.0 | 0.6 | 0.0 | 91.5 |
| 87.8 | 6.6 | 2.8 | 0.0 | 0.0 | 2.8 | 0.0 | 90.6 |
| 85.1 | 9.0 | 2.6 | 1.5 | 0.0 | 1.8 | 0.0 | 87.7 |
| 88.8 | 7.5 | 3.0 | 0.0 | 0.0 | 0.7 | 0.0 | 91.8 |
| 87.0 | 6.4 | 2.6 | 0.0 | 0.0 | 4.1 | 0.0 | 89.5 |

CONCLUSIONS

The reproductive potential of *Sarcothalia crispata* is extremely high and the spores of this species attach with ease to artificial substrates, on condition that the substrates are properly treated before inoculation as described above. The growth of *Sarcothalia crispata* spores in the hatchery is fast and within 45 days it is possible to obtain seedlings which may be transferred to the sea.

In the wild it has been found that a wet biomass of around 200-300 g per square metre can be achieved. On the other hand using the method and system of the present invention it has been found possible to achieve an average of 2 kg and even up to 5 kg wet biomass per square metre of net, which is a vast improvement over a harvest from the wild.

The present invention allows the production of pure batches of lambda carrageenan on an industrial scale, e.g. batches containing preferably at least 80 wt %, more preferably at least 90 wt %, most preferably about 100% of lambda carrageenan relative to the total mass of the batch and having a weight of at least 100 kg, more preferably at least 500 kg, most preferably at least 1000 kg. That is to say, for a harvested batch of seaweed the lambda carrageenan content is at least 90 wt. %, more preferably at least 95 wt. %, most preferably about 100% based on mass of all carrageenans and the mass of lambda carrageenan is at least 100 kg, more preferably at least 500 kg, most preferably at least 1000 kg. By a "harvested batch" herein we mean a single batch of seaweed, harvested in one instance which is not blended or combined with other batches and wherein the concentration of lambda carrageenan has not otherwise been concentrated.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof. Although certain example embodiments of the invention have been described, the scope of the appended claims is not intended to be limited solely to these embodiments. The claims are to be construed literally, purposively, and/or to encompass equivalents.

The invention claimed is:

1. A method of cultivating carageenophytic seaweed, the method comprising:
   a. providing a reproductive tissue of the seaweed;
   b. releasing spores from the reproductive tissue by:
      (i) contacting the reproductive tissue with a non-saline aqueous solution;
      (ii) at least partially dehydrating the reproductive tissue;
      (iii) contacting said at least partially dehydrated tissue with a first saline solution to produce a spore-containing saline; and
      (iv) optionally filtering the spore-containing saline;
   c. adding the spore-containing saline to a container containing a second saline solution and a substrate and allowing the spores to settle on the substrate, wherein said substrate is at least partially immersed in said second saline solution;
   d. germinating spores on the substrate; and
   e. growing the seaweed from the germinated spores.

2. The method of claim 1 wherein step b.(i) comprises contacting the seaweed reproductive tissue with a non-saline aqueous solution for at most 1 hour.

3. The method of claim 1, wherein the substrate is a net.

4. The method of claim 1, wherein the substrate, prior to use, is washed with a non-saline aqueous solution, is sterilized with boiling or near-boiling water, or combinations thereof.

5. The method of claim 1, wherein the spore-containing saline produced in step b. has a spore concentration of 60-65 million spores per litre.

6. The method of claim 1, wherein the second saline solution in the container of step c. has a spore concentration of 4.8 million to 5.2 million spores per litre.

7. The method of claim 1, wherein the number of spores germinated on the substrate at step d. is at least 150 per linear centimetre substrate.

8. The method of claim 1, wherein the germinating step d. includes the steps of washing the substrate, washing the vessel, or combinations thereof.

9. The method of claim 1, wherein the seaweed is *Sarcothalia crispata*.

10. The method of claim 9 wherein the seaweed reproductive tissue is obtained from the cystocarpic phase of the seaweed.

11. The method of claim 1, further comprising transferring to the sea either the germinated spores of step d. or partially grown seaweed produced by step e. and growing the seaweed in the sea.

12. The method of claim 11 further comprising harvesting the seaweed from the sea.

13. The method of claim 1, wherein the reproductive tissue of the seaweed comprises fronds containing spores.

* * * * *